United States Patent
Han et al.

(10) Patent No.: US 9,840,420 B2
(45) Date of Patent: Dec. 12, 2017

(54) SILICON CARBIDE POWDER, METHOD FOR MANUFACTURING THE SAME AND SILICON CARBIDE SINTERED BODY, METHOD FOR MANUFACTURING THE SAME

(71) Applicant: LG INNOTEK CO., LTD., Seoul (KR)

(72) Inventors: Jung Eun Han, Seoul (KR); Dong Geun Shin, Seoul (KR); Byung Sook Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 432 days.

(21) Appl. No.: 14/369,049

(22) PCT Filed: Dec. 14, 2012

(86) PCT No.: PCT/KR2012/010958
§ 371 (c)(1),
(2) Date: Jun. 26, 2014

(87) PCT Pub. No.: WO2013/100455
PCT Pub. Date: Jul. 4, 2013

(65) Prior Publication Data
US 2014/0356274 A1    Dec. 4, 2014

(30) Foreign Application Priority Data
Dec. 26, 2011  (KR) .................. 10-2011-0142886

(51) Int. Cl.
*C04B 35/571* (2006.01)
*C01B 31/36* (2006.01)
(Continued)

(52) U.S. Cl.
CPC .............. *C01B 31/36* (2013.01); *C01B 31/18* (2013.01); *C04B 35/571* (2013.01);
(Continued)

(58) Field of Classification Search
None
See application file for complete search history.

(56) References Cited

U.S. PATENT DOCUMENTS 4,702,901 A    10/1987 Shalek
4,873,069 A    10/1989 Weaver et al.
(Continued)

FOREIGN PATENT DOCUMENTS

JP    H02-048499 A    2/1999
KR    WO 2011025285 A2 *    3/2011    ............. B82Y 30/00

OTHER PUBLICATIONS

International Search Report in International Application No. PCT/KR2012/010958, filed Dec. 14, 2012.

*Primary Examiner* — Guinever S Gregorio
(74) *Attorney, Agent, or Firm* — Saliwanchik, Lloyd & Eisenschenk

(57) ABSTRACT

A method for manufacturing a silicon carbide powder according to the embodiment includes forming a mixture by mixing a silicon (Si) source containing silicon with a solid carbon (C) source or a C source containing an organic carbon compound; heating the mixture; cooling the mixture; and supplying hydrogen gas into the mixture.

13 Claims, 2 Drawing Sheets

(51) Int. Cl.
*C01B 31/18* (2006.01)
*C04B 35/645* (2006.01)
*C04B 35/575* (2006.01)
*C04B 35/626* (2006.01)
*C04B 35/634* (2006.01)

(52) U.S. Cl.
CPC ...... *C04B 35/575* (2013.01); *C04B 35/62695* (2013.01); *C04B 35/634* (2013.01); *C04B 35/645* (2013.01); *C04B 2235/48* (2013.01); *C04B 2235/6582* (2013.01); *C04B 2235/723* (2013.01); *C04B 2235/77* (2013.01)

(56) References Cited

U.S. PATENT DOCUMENTS

| | | |
|---|---|---|
| 4,873,070 A | 10/1989 | Kaji et al. |
| 5,190,737 A * | 3/1993 | Weimer ................ B01J 8/0095 423/345 |
| 6,001,756 A | 12/1999 | Takahashi et al. |
| 6,251,353 B1 | 6/2001 | Kajiwara et al. |
| 2010/0055017 A1* | 3/2010 | Vanier ................ C01B 3/342 423/291 |

\* cited by examiner

[Fig. 1]
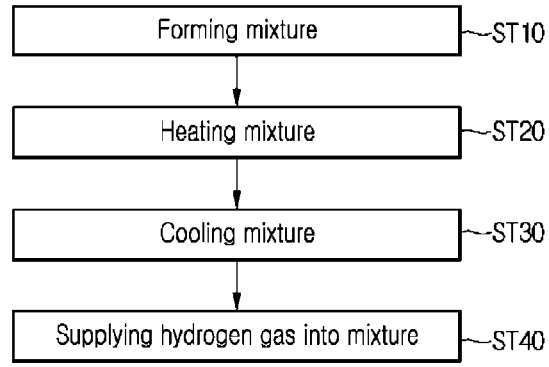
[Fig. 2]
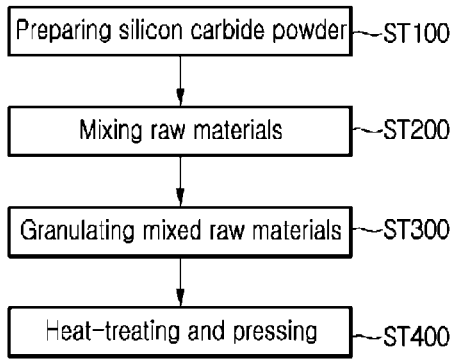
[Fig. 3]
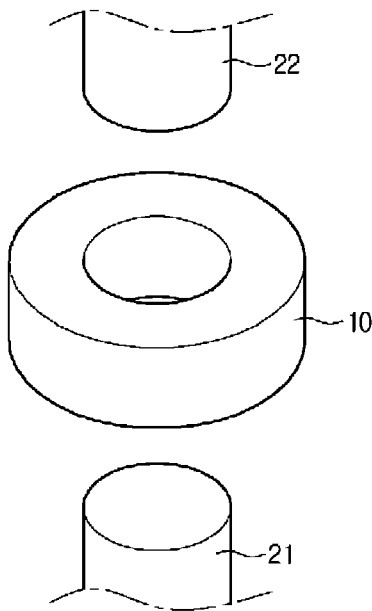

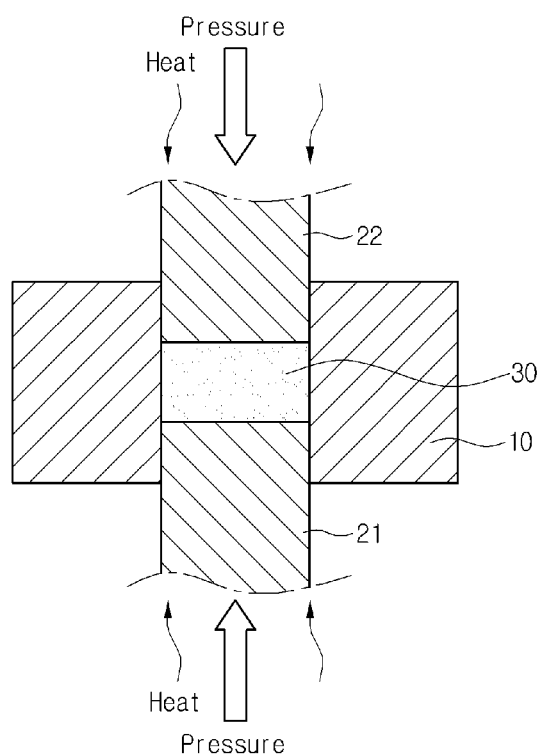
[Fig. 4]

SILICON CARBIDE POWDER, METHOD FOR MANUFACTURING THE SAME AND SILICON CARBIDE SINTERED BODY, METHOD FOR MANUFACTURING THE SAME

CROSS-REFERENCE TO RELATED APPLICATIONS

This application is the U.S. national stage application of International Patent Application No. PCT/KR2012/010958, filed Dec. 14, 2012, which claims priority to Korean Application No. 10-2011-0142886, filed Dec. 26, 2011, the disclosures of each of which are incorporated herein by reference in their entirety.

TECHNICAL FIELD

The embodiment relates to a silicon carbide powder, a method for manufacturing the same, a silicon carbide sintered body, and a method for manufacturing the same.

BACKGROUND ART

Recently, silicon carbide has been used in various electronic devices as a semi-conductor material for various purposes. In particular, the silicon carbide is very useful because the silicon carbide has the superior physical strength and high resistance against the chemical attack. In addition, the silicon carbide represents the superior electronic characteristics, such as the high radiation hardness, high breakdown filed, relatively wide bandgap, high saturated electron drift velocity, high operating temperature, and high absorption and emission of quantum energy in the blue, violet and ultraviolet bands of a spectrum.

A silicon carbide powder can be manufactured by mixing and heating source materials, such as a silicon source and a carbon source. A scheme for fabricating the silicon carbide powder uses an Acheson scheme, a carbon-thermal reduction scheme, a liquid polymer thermal decomposition scheme, and a CVD (Chemical Vapor Deposition) scheme. In particular, the liquid polymer thermal decomposition scheme or the carbon-thermal reduction scheme is used for synthesizing a high purity silicon carbide powder.

Residual oxygen produced during reaction may be included in the silicon carbide powder manufactured through the schemes. Such residual oxygen may interfere with the contact between particles of the silicon carbide powder during manufacture of a silicon carbide sintered body using the silicon carbide powder to affect sintering of the silicon carbide, thereby causing reduction of density of the silicon carbide sintered body, a process efficiency, and a yield rate.

Accordingly, there is a need for a scheme capable of reducing an amount of the residual oxygen contained in the silicon carbide powder during the manufacture of the silicon carbide powder.

DISCLOSURE OF INVENTION

Technical Problem

The embodiment provides a method of manufacturing a silicon carbide powder capable of reducing residual oxygen included in the silicon carbide powder, the silicon carbide powder manufactured by the method, and a silicon carbide sintered body manufactured using the silicon carbide powder.

Solution to Problem

According to the embodiment, there is provided a method for manufacturing a silicon carbide powder, the method including: forming a mixture by mixing a silicon (Si) source containing silicon with a carbon (C) source containing a solid carbon source or an organic carbon compound; heating the mixture; cooling the mixture; and supplying hydrogen gas into the mixture.

The silicon carbide power may include residual oxygen of about 1 wt % of less.

According to the embodiment, there is provided a method for manufacturing a silicon carbide sintered body, the method including: preparing a silicon carbide power; loading the silicon carbide powder in a mold; and hot-pressing the silicon carbide powder, wherein the silicon carbide powder is manufactured by: forming a mixture by mixing a silicon (Si) source containing silicon with a solid carbon (C) source or a C source containing an organic carbon compound; heating the mixture; cooling the mixture; and supplying hydrogen gas into the mixture.

The silicon carbide sintered body may have density in a range of about 2.9 $g/cm^3$ to about 3.10 $g/cm^3$.

Advantageous Effects of Invention

According to a silicon carbide powder and the method of manufacturing the same of the embodiment, hydrogen gas is supplied into a mixed raw material received in a crucible during a cooling process. Accordingly, an amount of the residual oxygen in the silicon carbide powder can be reduced.

Therefore, since an additional process for removing residual oxygen in the silicon carbide powder is omitted, the process efficiency can be improved and a process cost can be reduced.

In addition, according to the silicon carbide sintered body and the method of manufacturing the same of the embodiment, since the silicon carbide sintered body is manufactured using a silicon carbide powder having reduced residual oxygen, the influence of the residual oxygen interfering with the reaction between silicon carbide particles is reduced to facilitate the reaction between particles so that a high quality silicon carbide sintered body having high density and compactness can be manufactured.

BRIEF DESCRIPTION OF DRAWINGS

FIG. 1 is a flowchart showing a method of manufacturing a silicon carbide powder according to the embodiment.

FIG. 2 is a flowchart showing a method of manufacturing a silicon carbide sintered body according to the embodiment.

FIG. 3 is a schematic view showing a hot press sintering apparatus for manufacturing a silicon carbide sintered body according to the embodiment.

FIG. 4 is a view showing a procedure of manufacturing a silicon carbide sintered body according to the embodiment.

MODE FOR THE INVENTION

Hereinafter, a method of manufacturing a silicon carbide powder according to the embodiment will be described in detail with reference to accompanying drawings.

FIG. 1 is a flowchart showing a method of manufacturing a silicon carbide powder according to the embodiment.

Referring to FIG. 1, the method of manufacturing a silicon carbide powder according to the embodiment includes forming a mixture by mixing a silicon (Si) source containing silicon with a carbon (C) source containing a solid carbon source or an organic carbon compound (ST10); heating the mixture (ST20); cooling the mixture (ST30); and supplying hydrogen gas into the mixture (ST40).

Hereinafter, each step of the method will be described in more detail.

In step ST10 of producing the mixture, the Si source and the C source are prepared and mixed with each other to form a mixture material.

The silicon source may include various materials capable of providing silicon. For instance, the silicon source may include silica sol, silicon dioxide, fine silica and quartz powder, but the embodiment is not limited thereto. For instance, an organic silicon compound including silicon may be used as the silicon source.

The carbon source may include a solid carbon source or an organic carbon compound.

The solid carbon source may include a carbon black, a carbon nano tube (CNT), or fullerene ($C_{60}$).

The organic carbon compound may include at least one of phenol resin, franc resin, xylene resin, polyimide, polyurethane, polyacrylonitrile, polyvinyl alcohol, cellulose, sugar, pitch, and tar.

The carbon source and the silicon source may be mixed with each other through the wet mixing process using the solvent or the dry mixing process without using the solvent. According to the wet mixing process, the carbon source can be conglomerated with the silicon source, so that the productivity can be improved. In addition, according to the dry mixing process, the cost for the solvent can be saved, the pollution caused by the solvent can be prevented, and the carbonization process can be omitted, so that the process can be simplified.

The silicon source and the carbon source are mixed by using a ball mill or an attrition mill to recover mixture powder. The mixture powder can be recovered by filtering the mixture through a sieve.

The silicon source and the carbon source can be mixed in a predetermined mass ratio. For instance, a mole ratio of carbon included in the carbon source to silicon included in the silicon source (hereinafter, referred to as mole ratio of carbon to silicon) is in the range of about 1:1.5 to 1:3. If the mole ratio of carbon to silicon exceeds 3, the amount of carbon is so excessive that the amount of residual carbon, which does not participate in the reaction, is increased, lowering the recovery rate. In addition, if the mole ratio of carbon to silicon is less than 1.5, the amount of silicon is so excessive that the amount of residual silicon, which does not participate in the reaction, is increased, lowering the recovery rate. That is, the mole ratio of carbon to silicon must be determined by taking the recovery rate into consideration.

Since the silicon source is volatilized into a gas phase at the high temperature during the reaction, the mole ratio of carbon to silicon is set in the range of 1.8 to 2.7.

The silicon source is uniformly mixed with the carbon source to form the mixture.

After that, in step ST20 of heating the mixture, the mixture is heated. In detail, the mixture is weighed in a graphite crucible and then the mixture is supplied and heated in a high-temperature reaction furnace, such as a graphite furnace. The process to form the silicon carbide powder may be classified into the carbonization process and the synthesis process.

In the carbonization process, the organic carbon compound is carbonized so that carbon is produced. The carbonization process is performed at the temperature in the range of about 600° C. to about 1200° C. In detail, the carbonization process is performed at the temperature in the range of about 800° C. to about 1100° C. If the solid carbon source is used as the carbon source, the carbonization process may be omitted.

After that, the synthesis process is performed. In the synthesis process, the dry silicon source is reacted with the solid carbon source or the organic carbon compound, so that the dry silicon carbide is formed through following reaction formulas 1 to 3.

SiO2(s)+C(s)→SiO(g)+CO(g)    [Reaction formula 1]

SiO(g)+2C(s)→SiC(s)+CO(g)    [Reaction formula 2]

SiO2(s)+3C(s)→SiC(s)+2CO(g)    [Reaction formula 3]

In order to facilitate the above reaction, the heating temperature is set to 1300° C. or above. If the heating temperature is set in the range of 1300° C. to 1900° C., the fabricated silicon carbide may have the β type, which is the low-temperature stable phase. The silicon carbide having the β type consists of fine particles, so the strength of the silicon carbide can be improved. However, the embodiment is not limited thereto. For instance, if the heating temperature exceeds 1800° C., the silicon carbide may have the α type, which is the high-temperature stable phase. The synthesis process may be performed for about 1 hour to about 7 hours.

Next, in step ST30 of cooling the mixture and step ST40 of supplying hydrogen gas into the mixture, a high-temperature reaction furnace, for example, a graphite furnace is cooled and the hydrogen gas is supplied into the crucible during the cooling.

The hydrogen gas may remove the residual oxygen included in the silicon carbide powder. That is, the residual oxygen included in the silicon carbide powder may be removed in such a way that the residual oxygen is reduced in the hydrogen gas. The hydrogen gas may be supplied at a rate in the range of about 0.1 L/min to about 100 L/min. Preferably, the hydrogen gas may be supplied at a rate in the range of about 0.1 L/min to about 50 L/min. If the hydrogen gas is supplied at the rate less than 0.1 L/min, the residual oxygen may not be reduced but remain.

Accordingly, the silicon carbide powder manufactured by the method of manufacturing the silicon carbide powder according to the embodiment may include residual oxygen of about 1 weight % or less. Preferably, the silicon carbide powder may include the residual oxygen of about 0.5 weight % or less. More preferably, the silicon carbide powder may include the residual oxygen of about 0.1 weight % or less.

According to the silicon carbide powder and the method of manufacturing the same, since an additional process for removing residual oxygen in the silicon carbide powder is omitted, the process efficiency can be improved and a process cost can be reduced.

In addition, since the residual oxygen included in the silicon carbide powder is removed during manufacture of the silicon carbide sintered body using the silicon carbide powder, silicon carbide particles easily make contact with each other so that the silicon carbide sintered body having high density and compactness can be manufactured Hereinafter, a method of manufacturing a silicon carbide sintered body according to the embodiment will be described with reference to FIG. 2.

FIG. 2 is a flowchart showing a method of manufacturing a silicon carbide sintered body according to the embodiment.

Referring to FIG. 2, the method of manufacturing the silicon carbide sintered body according to the embodiment may include preparing a silicon carbide powder (ST100), mixing raw materials (ST200), granulating the mixed raw materials (ST300), and heat-treating and pressing the granulated raw materials (ST400). In the method of manufacturing the silicon carbide sintered body according the embodiment, the silicon carbide sintered body is formed by a hot press sintering scheme. The method of manufacturing the silicon carbide sintered body according the embodiment will be described in detail as follows.

In step ST100 of preparing the silicon carbide powder, the silicon carbide powder serving as a raw material for preparing the silicon carbide sintered body according to the embodiment is prepared. The silicon carbide powder may be manufactured in the same manner as in the method of manufacturing the silicon carbide powder according to the embodiment. That is, the residual oxygen in the silicon carbide powder may be about 1 weight % or less. Preferably, the residual oxygen in the silicon carbide powder may be about 0.5 weight % or less. More preferably, the residual oxygen in the silicon carbide powder may be about 0.1 weight % or less.

In step ST200 of mixing the raw materials, the silicon carbon powder is dispersed in solvent.

The silicon carbide powder may be prepared by mixing resin including carbon with the solvent. The resin may include phenol resin and the solvent may include an alcoholic material or a water-based material. The alcoholic material includes methanol, ethanol or isopropyl alcohol (IPA), and the water-based material includes water, but the embodiment is not limited thereto.

Then, in step ST300 of granulating the mixed raw materials, the mixed raw materials are granulated. For example, the mixed raw materials may be granulated using a spray dryer.

Subsequently, the granulated silicon carbide powder is disposed in a hot press sintering apparatus. Referring to FIG. 3, the hot press sintering apparatus includes a mold 10, a first press part 21, and a second press part 22. The hot press sintering apparatus may further include a heat generating part applying heat into the mold 10.

The mold 10 includes a space for receiving a raw material to be molded. The second press part 22 faces the first press part 21. The first press part 21 and the second press part 22 are inserted into the mold 10.

As shown in FIG. 4, the granulated silicon carbide powder 30 is disposed in the mold 10. In detail, the granulated silicon carbide powder 30 is disposed between the first press part 21 and the second press part 22.

After that, the granulated silicon carbide powder 30 is subject to the heat treatment and pressing processes (ST400). The granulated silicon carbide powder 30 may be heat-treated and pressed at a temperature in the range of about 2000° C. to about 2500° C. and at pressure in the range of about 20 MPa to about 40 MPa.

The silicon carbide sintered body manufactured by the method of manufacturing the silicon carbide sintered body may has a compact structure of high density in the range of about 2.9 g/cm$^3$ to about 3.10 g/cm$^3$. That is, since the residual oxygen interfering with the reaction between silicon carbide particles due to the residual oxygen during manufacture of the silicon carbide sintered body is reduced to about 1 weight % or less, about 0.5 weight % or less, or about 0.1 weight % or less, the reaction between the silicon carbide particles is easily achieved. Accordingly, the method of manufacturing the silicon carbide sintered body can manufacture a high quality silicon carbide sintered body having high density.

Hereinafter, the method for manufacturing the silicon carbide powder according to the embodiments and comparative example will be described in more detail. The following embodiments are illustrative purpose only and the disclosure is not limited to the embodiments.

Manufacture Example 1

About 10 g of fumed silica and about 12 g of phenol resin were mixed to prepare mixture. After that, the mixture was subject to the carbonization process at the temperature of about 800° C. for one hour while rising the temperature at the rate of 3° C./min and then subject to the synthesis process at the temperature of about 1700° C. for two hours while rising the temperature at the rate of 5° C./min, thereby forming a silicon carbide powder. Next, hydrogen gas was supplied at the temperature of 1400° C. and at the rate of 2 L/min during a cooling process.

The reaction was started at the initial vacuum degree of 5×10-2 Torr or less and continued by operating a rotary pump. Argon (Ar) gas as process gas was supplied at the rate of 5 L/min.

About 2 g of resin was mixed with about 48 g of the silicon carbide powder using a ball mill, and the mixture is granulated using a spray dryer. The granulated silicon carbide powder was loaded in a graphite mold and the granulated raw material was subject to the temperature of 2100° C. and the pressure of 20 MPa to manufacture the silicon carbide sintered body.

Manufacture Example 2

A silicon carbide sintered body was manufactured in the same manner as that of the manufacture example 1 except that hydrogen gas is supplied at a rate of 5 L/min.

Manufacture Example 3

A silicon carbide sintered body was manufactured in the same manner as that of the manufacture example 1 except that hydrogen gas is supplied at a rate of 10 L/min.

Comparative Example 1

A silicon carbide sintered body was manufactured in the same manner as that of the manufacture example 1 except that hydrogen gas is not supplied during a cooling process.

TABLE 1

|  | Residual oxygen of silicom carbide powder (wt %) | Density of silicon carbide sintered body (g/cm$^3$) |
| --- | --- | --- |
| Manufacture example 1 | 0.928 | 2.96 |
| Manufacture example 2 | 0.435 | 3.00 |
| Manufacture example 3 | 0.076 | 3.03 |
| Comparative example 1 | 3.140 | 2.80 |

Referring to Table 1, the residual oxygen of the silicon carbide powder according to the manufacture examples 1 to 3 is less than the residual oxygen of the silicon carbide powder according to the comparative example. Further, the density of the silicon carbide sintered body according to the manufacture examples 1 to 3 is higher than the density of the silicon carbide sintered body according to the comparative example.

Accordingly, during manufacture of the silicon carbide powder or the silicon carbide sintered body, hydrogen gas is supplied so that residual oxygen in the silicon carbide powder can be reduced. Therefore, the silicon carbide powders can easily make contact with each other during the manufacture of the silicon carbide sintered body so that the density of the silicon carbide sintered body can be improved.

That is, since an amount the residual oxygen included during synthesis of the silicon carbide powder can be controlled by the hydrogen gas, the influence of the oxygen interfering with the sintering process during the manufacture of the silicon carbide sintered body can be reduced so that the high quality silicon carbide sintered body having high density can be manufactured.

Referring to the manufacture examples 1 to 3, an amount of the residual oxygen becomes reduced as the amount of the hydrogen gas is increased. Accordingly, it may be understood that a silicon carbide sintered body having higher density can be manufactured.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A method for manufacturing a silicon carbide powder, the method comprising:
    forming a mixture by mixing a silicon (Si) source containing silicon with a carbon (C) source containing a solid carbon source or an organic carbon compound;
    heating the mixture;
    cooling the mixture; and
    supplying hydrogen gas into the mixture,
    wherein the hydrogen gas is supplied during the cooling,
    wherein the hydrogen gas removes residual oxygen included in the silicon carbide powder,
    wherein the hydrogen gas is supplied at a rate in a range of about 5 L/min to about 10 L/min, and
    wherein the hydrogen gas is independently supplied.

2. The method of claim 1, wherein the silicon source comprises at least one of silica sol, silicon dioxide, fine silica, and quartz powder.

3. The method of claim 2, wherein the solid carbon source comprises at least one of a carbon black, a carbon nano tube (CNT), and fullerene (C60).

4. The method of claim 2, wherein the organic carbon compound comprises at least one of phenol resin, franc resin, xylene resin, polyimide, polyurethane, polyacrylonitrile, polyvinyl alcohol, cellulose, pitch, tar and sugar.

5. The method of claim 1, wherein the carbon source and the silicon source are mixed with a wet mixing process.

6. The method of claim 1, wherein the carbon source and the silicon source are mixed with a dry mixing process.

7. The method of claim 1, wherein the silicon source and the carbon source are mixed by using a ball mill or an attrition mill.

8. The method of claim 1, wherein a mole ratio of carbon included in the carbon source to silicon included in the silicon source is in the range of about 1:1.5 to 1:3.

9. The method of claim 1, wherein a mole ratio of carbon included in the carbon source to silicon included in the silicon source is in the range of about 1:1.8 to 1:2.7.

10. The method of claim 1, wherein the heating the mixture comprises a carbonization process and a synthesis process.

11. The method of claim 10, wherein the carbonization process is performed at a temperature in the range of 600° C. to 1200° C.

12. The method of claim 10, wherein the carbonization process is performed at a temperature in the range of 800° C. to 1100° C.

13. The method of claim 10, wherein the synthesis process is performed at a temperature in a range of 1300° C. to 1900° C.

* * * * *